/ Patented Aug. 4, 1953

2,647,920

UNITED STATES PATENT OFFICE 2,647,920

TELOMERIC POLYALKYL OXOESTERS

Tracy M. Patrick, Jr., Dayton, and Earl W. Gluesenkamp, Centerville, Ohio, assignors to Monsanto Chemical Company, St. Louis, Mo., a corporation of Delaware No Drawing. Application December 9, 1950, Serial No. 200,101

17 Claims. (Cl. 260—483)

This invention relates to a novel process for the preparation of telomeric polyalkyl oxoesters comprising the reaction of saturated aldehydes with aliphatic esters of a 4 to 5 carbon atom monoethylenic unsaturated dicarboxylic acid, wherein the ethylenic bond is conjugated with both carbonyl groups, in the presence of a free radical promoting agent and to the telomeric products produced thereby.

The definitions pertaining to "telomers" and "telomerization" are to be found in U. S. Patent 2,440,800, wherein said terms were defined so as to provide adequate means for distinguishing reactions such as those herein disclosed from conventional polymerization reactions.

The telomeric compositions of this invention can be diagrammatically represented by the structural formula

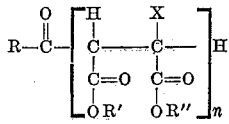

wherein R is a saturated radical containing up to 17 and preferably up to 7 carbon atoms selected from the group consisting of alkyl, cycloalkyl and heterocyclic radicals, R' and R'' are alkyl radicals containing up to 18 and preferably up to 8 carbon atoms, X is selected from the group consisting of —H and —CH$_3$, and $n$ is an integer greater than 1. In general, $n$ is an integer and can range from about 2 to about 20 and preferably from about 2 to about 5 for an isolated telomer. However, the mixed telomeric compositions are suitable for most purposes without separation into their component parts, thus the average value of $n$ will generally be a mixed number greater than 2.

The 4 to 5 carbon atom monoethylenic dicarboxylic acids are maleic acid, fumaric acid, citraconic acid and mesaconic acid. The aliphatic esters of the foregoing acids can be mono-esters but are preferably substantially completely esterified to the di-ester. When the aldehyde reacts with the unsaturated dicarboxylic acid or partial ester such that the carbon atom with which the acyl group forms a new carbon-carbon bond also has a carboxyl radical attached thereto the compound so formed is in general unstable, evolving carbon dioxide from the carboxyl radical, whereas when the carboxyl group is esterified, prior to the reaction with the aldehyde, decarboxylation does not occur. Furthermore whereas mixed esters of the dicarboxylic acid can be employed it is generally preferable that the ester groups be identical since it is not economical to esterify preferentially the polycarboxylic acid with mixed alcohols to obtain substantially homogeneous products. Thus, esters, partial esters and mixed esters of the aforementioned acids can be, for example, dimethyl maleate, diethyl maleate, dipropyl maleate, dibutyl maleate, dihexyl maleate, di-2-ethylhexyl maleate, didodecyl maleate, ditetradecyl maleate, dioctadecyl maleate, methyl hydrogen maleate, ethyl hydrogen maleate, 2-ethylhexyl hydrogen maleate, methyl ethyl maleate, ethyl 2-ethylhexyl maleate, and the like. Whereas the foregoing examples are limited to maleates, it will be readily understood that similar compounds of fumarates, citraconates and mesaconates can be employed.

The saturated aldehydes can be selected from the group consisting of aliphatic, alicyclic and heterocyclic aldehydes, as for example, ethanal, propanal, butanal, pentanal, hexanal, heptanal, octanal, nonanal, decanal, dodecanal, tetradecanal, hexadecanal, octadecanal, 2-ethylhexanal, hexahydrobenzaldehyde, tetrahydrofurfural and the like. The saturated aliphatic aldehydes are preferred.

The term "free radical promoting agent" as used herein embraces ultraviolet radiation and free radical promoting catalysts. The free radical promoting catalysts are, for example, acetyl peroxide, t-butyl peroxide, t-butyl hydroperoxide, benzoyl peroxide, lauroyl peroxide, stearoyl peroxide, hydrogen peroxide, peracetic acid, sodium perborate, potassium persulfate and the like. The free radical promoting catalyst is generally employed at from about 0.1 to about 5 mole per cent and preferably from about 0.25 to about 2 mole per cent based on the alkyl esters of the 4 to 5 carbon atom ethylenic dicarboxylic acid; and the catalyst may be added all at once, in increments or continuously over a period of time.

The temperature at which the reaction is maintained is not critical. The temperature may range from —50° C. to the decomposition point of the reactants but the range of from about 25° C. to about 100° C. is preferred. In general the temperature should be selected such that the free radical promoting catalyst is decomposed at a moderate rate during the course of the reaction, for example, if benzoyl peroxide is the free radical promoting catalyst a temperature in the range of from about 70° C. to about 90° C. is preferred.

The pressure should preferably be sufficient to maintain the reactants in a liquid state during the reaction, thus relatively volatile reactants should be processed in a pressure vessel. In general, however, a reaction vessel equipped with a reflux condenser is suitable for most reactants.

The mole ratio of the aldehyde to the monoethylenic aliphatic ester can vary over a wide range, e. g., from about 5:1 to about 1:5 although ratios outside these limits are operable. In general it is preferable to have a molar excess of the aliphatic ester to obtain more favorable yields of telomer.

The reaction can be brought about by the direct mixing of the reactants or can be brought about in the presence of an inert organic solvent, e. g., benzene, cyclohexane, hexane and the like, as shown in the examples below, or the aldehyde can be added stepwise to the aliphatic ester throughout the course of the reaction. Proper agitation, e. g., refluxing, stirring, rocking, or passing an inert gas through the system, should be maintained to provide adequate mixing of the reactants.

The following examples are illustrative of the invention.

Example 1

A mixture of 36.0 g. (0.5 mole) of redistilled butanal, 172.0 g. (1.0 mole) diethyl maleate and 1.0 g. of benzoyl peroxide was introduced into a jacketed reaction vessel equipped with a reflux condenser. The jacket contained boiling (80° C.) benzene. Additional 1.0-g. samples of benzoyl peroxide were added after a reaction time of 16 and 40 hours respectively. Refluxing the benzene was discontinued after a total reaction time of 64 hours. The reaction mixture was then diluted with an equal volume of benzene, extracted with a saturated solution of sodium bicarbonate, washed twice with water, dried with anhydrous sodium sulfate, filtered and the filtrate distilled through a ten-inch Vigreux fractionating column. The benzene and unreacted materials were recovered. There was obtained 53.2 g. of the 1:1 adduct, diethyl butyrylsuccinate, and 102.3 g. of a yellow viscous liquid telomeric residue which did not distill at a pot temperature of 176° C./1 mm.

Example 2

A mixture of 36.0 g. (0.50 mole) of redistilled butanal, 86.0 g. (0.50 mole) of diethyl maleate and 0.5 g. of benzoyl peroxide was introduced into a jacketed reaction vessel as in Example 1. Additional 0.5-g. samples of benzoyl peroxide were added after a reaction time of 16 and 48 hours respectively and the total reaction time was 63.5 hours. The reaction mixture was treated in a similar manner to Example 1. There was obtained 75.9 g. of diethyl butyrylsuccinate and 36.1 g. of the telomeric residue which did not distill at a pot temperature up to 182° C./1.5 mm.

Example 3

A 43-g. sample (0.25 mole) of diethyl maleate was added to a 200 ml. round-bottomed flask and 72 g. (1.0 mole) of butanal was added thereto. The flask was fitted with a reflux condenser, and a thermometer; and was supported by an electric heating mantle. The mixture of ester and aldehyde was then brought to reflux (80° C.) and 2 g. of benzoyl peroxide was added. After 18 hours, the reflux temperature was 88° C. at which time the heating was discontinued and the reaction mixture allowed to cool. The pale yellow liquid reaction mixture was then extracted with about 50 ml. of a saturated sodium bicarbonate solution, washed twice with about 50 ml. of water, dried with a desiccant (anhydrous sodium sulfate), filtered and purified by fractional distillation. There was obtained 46.5 g. of diethyl butyrylsuccinate and 12.2 g. of a yellow viscous liquid telomeric residue.

Example 4

A mixture of 18 g. (0.25 mole) of redistilled butanal, 172 g. (1.0 mole) diethyl maleate and 150 cc. of benzene was introduced into a reaction vessel and the mixture brought to reflux (92° C.). Then 0.2 g. of benzoyl peroxide was added thereto and refluxing continued. Additional 0.1-g. samples of benzoyl peroxide were added after a reaction time of 23 and 46 hours respectively. The reaction was terminated after a total reaction time of 65 hours. The reaction mixture was then separated by fractional distillation. The pale yellow viscous liquid telomeric residue did not distill at a pot temperature of 170° C./1.5 mm. The over all conversion was down somewhat due to the dilution effect of the inert solvent but the reaction products consisted of 10.5% of diethyl butyrylsuccinate and 89.5% of the telomeric product.

Example 5

A 28.0-g. sample (163 mole) of diethyl fumarate and 47.0 g. (0.65 mole) of redistilled butanal were added to a reaction vessel and brought to reflux (82° C.), then 1.3 g. of benzoyl peroxide was added thereto and refluxing continued for 18 hours after which time the reflux temperature was 87.0 C. and heating was terminated. The reaction mixture was treated in a similar manner to Example 1. There was obtained 10.3 g. of diethyl butyrylsuccinate and 21.3 g. of a yellow viscous liquid telomeric residue.

Example 6

A 43-g. sample (0.25 mole) of diethyl maleate and 72 g. (1.0 mole) of redistilled butanal were added to a special four-necked, 1-liter flask equipped with a reflux condenser, thermometer, stirrer, and a 100-watt ultraviolet lamp enclosed in a quartz jacket. The lamp was fitted with a tapered glass stopper such that it could be inserted into the flask so that the glass of the flask would not filter the ultraviolet radiation. The flask was supported in a running water bath and the reaction carried out with agitation for about 7 hours at a temperature of from about 25 to 30° C. The lamp was turned off and the slightly yellow reaction mixture distilled through a fractionating column and the excess butanal recovered. In addition to the diethyl butyrylsuccinate there was obtained 11.4 g. of a nearly colorless viscous liquid telomeric residue.

Example 7

A 40.6-g. sample (0.236 mole) of diethyl maleate, 33 g. (0.75 mole) of redistilled ethanal and 0.5 g. of benzoyl peroxide were added to a Carius tube and well mixed. Then the air was swept out with dry nitrogen after which the Carius tube was sealed and placed in a Carius furnace held at 85 to 95° C. After 24 hours the Carius tube was removed and cooled in a Dry Ice-trichloroethylene mixture before opening. The reaction product was directly fractionally distilled. In addition to the diethyl acetyl-succinate there was obtained 7.8 g. of a yellow viscous liquid telomeric residue.

Example 8

An 86-g. sample (0.5 mole) of diethyl maleate was added to a 500 ml. round-bottomed flask and 171 g. (1.5 moles) of redistilled heptanal was added thereto. The flask was equipped as in Example 3. The mixture of ester and aldehyde was then brought to 70° C. and 0.5 g. of benzoyl peroxide was added. The reaction mixture was held at from about 70° C. to about 90° C. for 18 hours after which time the heating was discontinued and the reaction mixture allowed to cool. The yellowish liquid reaction mixture was then extracted with about 100 ml. of a saturated sodium bicarbonate solution, washed twice with about 100 ml. of water, dried with a desiccant, filtered and purified by fractional distillation. In addition to the diethyl heptanoylsuccinate there was obtained 23.3 g. of an amber viscous liquid telomeric residue.

Example 9

A 43-g. sample (0.25 mole) of diethyl maleate and 96 g. (0.75 mole) of redistilled 2-ethylhexanal were added to a 200 ml. flask as equipped in Example 3. The mixture was heated to 80° C. and 0.5 g. of benzoyl peroxide added thereto. The temperature was held at from about 80 to 90° C. for 16.5 hours after which time the reaction was terminated and the mixture separated by fractional distillation. In addition to the diethyl (2-ethylhexanoyl)succinate there was obtained 7.1 g. of a yellow viscous liquid telomeric residue.

Example 10

142-g. sample (0.5 mole) of dihexyl maleate was added to a 500 ml. round-bottomed flask and 108 g. (1.5 moles) of redistilled butanal was added thereto. The flask was equipped as in Example 3. The mixture of ester and aldehyde was then brought to reflux at 86° C. and 1 g. of benzoyl peroxide was added. After 24 hours the reflux temperature was 96° C. at which time the heating was discontinued and the reaction mixture allowed to cool. The pale yellow liquid reaction mixture was then extracted with 100 ml. of a saturated sodium bicarbonate solution, washed twice with about 100 ml. of water, anhydrous sodium sulphate added thereto to remove the residual water, filtered and purified by fractional distillation. In addition to the dihexyl butyrylsuccinate there was obtained 21.8 g. of an amber viscous liquid telomeric residue.

Example 11

A 136-g. sampe (0.4 mole) of di-2-ethylhexyl maleate and 86.4 g. (1.2 moles) of redistilled butanal were added to a 500 ml. flask equipped as in Example 3. The ester-aldehyde mixture was brought to reflux at 86° C. and 0.5 g. of benzoyl peroxide added thereto. After 18 hours the reflux temperature had risen to 95° C. at which time the reaction was terminated, the mixture being a clear, very pale orange liquid. The reaction mixture was separated by fractional distillation and in addition to the di-2-ethylhexyl butyrylsuccinate there was obtained 21.9 g. of an amber viscous liquid telomeric residue.

Example 12

A 115-g. sample (0.226 mole) of ditetradecyl maleate and 72 g. (1.0 mole) of redistilled butanal were added to a 500 ml. flask equipped as in Example 3. The mixture was brought to reflux at 83.3° C. and 0.2 g. of benzoyl peroxide added thereto. After approximately 4 hours reaction time, an additional 0.1 g. of benzoyl peroxide was added. The reaction was terminated after a total of 7 hours at reflux at which time the reflux temperature was 84° C. The reaction mixture was separated by fractional distillation and in addition to the ditetradecyl butyrylsuccinate there was obtained 23.8 g. of a yellow viscous liquid telomeric residue.

Whereas all the reaction conditions are not equivalent in the following summarized examples and are thus not directly comparable for all purposes, nevertheless it is clearly shown that the production of telomeric compositions is favored by the presence of a molar excess of the aliphatic ester.

| Example | Moles diethyl maleate per mole butanal | Percent 1:1 adduct | Percent Telomer |
| --- | --- | --- | --- |
| 3 | 0.25:1 | 79.2 | 20.8 |
| 2 | 1:1 | 67.8 | 32.2 |
| 1 | 2:1 | 34.2 | 65.8 |
| 4 | 4:1 | 10.5 | 89.5 |

The novel telomeric compositions of this invention are useful as lubricants, lubricant additives, softeners for synthetic rubber, wax composition additives and antifoam agents.

This application is a continuation-in-part of our copending application Serial No. 135,829, filed December 29, 1949, now abandoned.

We claim:

1. The telomeric composition

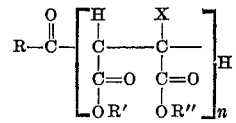

wherein R is a saturated hydrocarbon radical containing up to 17 carbon atoms, R' and R'' are alkyl radicals containing up to 18 carbon atoms, X is selected from the group consisting of —H and —CH3, and $n$ is an integer from 2 to 20.

2. The telomeric composition of claim 1 wherein R is an alkyl radical containing up to 7 carbon atoms, X is —H, and $n$ is an integer from 2 to 5.

3. The telomeric composition of claim 2 wherein R' and R'' are alkyl radicals containing up to 8 carbon atoms.

4. The telomeric composition of claim 3 wherein R' and R'' are identical alkyl radicals.

5. The telomeric composition of claim 4 wherein R is a n-propyl radical and R' and R'' are ethyl radicals.

6. The telomeric composition of claim 4 wherein R is a methyl radical and R' and R'' are ethyl radicals.

7. The telomeric composition of claim 4 wherein R is a n-hexyl radical and R' and R'' are ethyl radicals.

8. The telomeric composition of claim 4 wherein R is a n-propyl radical and R' and R'' are hexyl radicals.

9. The telomeric composition of claim 4 wherein R is a n-propyl radical and R' and R'' are 2-ethylhexyl radicals.

10. The process of preparing a telomeric composition comprising the reaction of a molar excess of an alkyl ester of a 4 to 5 carbon atom mono-ethylenic unsaturated dicarboxylic acid, wherein the ethylenic bond is conjugated with both carbonyl groups, and the said alkyl radical contains up to 18 carbon atoms, with a saturated 2 to 18 carbon atom aldehyde in the presence of a free radical promoting agent, and separating the telomeric composition from the reaction mixture.

11. The process of claim 10 wherein the alkyl radical of the ester contains up to 8 carbon atoms, the aldehyde is a saturated aliphatic aldehyde containing from 2 to 8 carbon atoms, and the free radical promoting agent is a peroxygen catalyst.

12. The process of claim 11 wherein the alkyl radicals of the ester are identical alkyl radicals.

13. The process of preparing a telomeric composition comprising the reaction of (A) butanal with a molar excess of (B) diethyl maleate in the presence of (C) benzoyl peroxide and separating the telomeric composition from the reaction mixture.

14. The process of preparing a telomeric composition comprising the reaction of (A) ethanal with a molar excess of (B) diethyl maleate in the presence of (C) benzoyl peroxide and separating the telomeric composition from the reaction mixture.

15. The process of preparing a telomeric composition comprising the reaction of (A) heptanal with a molar excess of (B) diethyl maleate in the presence of (C) benzoyl peroxide and separating the telomeric composition from the reaction mixture.

16. The process of preparing a telomeric composition comprising the reaction of (A) butanal with a molar excess of (B) dihexyl maleate in the presence of (C) benzoyl peroxide and separating the telomeric composition from the reaction mixture.

17. The process of preparing a telomeric composition comprising the reaction of (A) butanal with a molar excess of (B) di-2-ethylhexyl maleate in the presence of (C) benzoyl peroxide and separating the telomeric composition from the reaction mixture.

TRACY M. PATRICK, Jr.
EARL W. GLUESENKAMP.

References Cited in the file of this patent

UNITED STATES PATENTS

| Number | Name | Date |
|---|---|---|
| 1,872,834 | Skirrow | Aug. 23, 1932 |

OTHER REFERENCES

Ellis, "Chemistry of Synthetic Resins," vol. II, Reinold Publishing Co., New York, N. Y., 1935, page 1069.